United States Patent [19]

Creps et al.

[11] 4,421,645
[45] Dec. 20, 1983

[54] COMPACT UNIVERSAL DRUM FILTER SETTLER

[75] Inventors: John L. Creps, Rudolph, Ohio; Robert J. Fox, Waukesha, Wis.; Ted W. Guelde, Deshler, Ohio; Eugene H. Harms, Perrysburg, Ohio; Stephen N. McEwen, Bowling Green, Ohio

[73] Assignee: Henry Filters, Inc., Bowling Green, Ohio

[21] Appl. No.: 424,427

[22] Filed: Sep. 27, 1982

[51] Int. Cl.[3] .................. B01D 21/12; B01D 33/06
[52] U.S. Cl. .................................. 210/260; 210/400; 210/525; 210/526
[58] Field of Search ................ 285/267–269, 285/33–35, 31; 403/321, 322, 325, 17, 18, DIG. 4; 210/784, 161, 232, 237, 238, 404, 402, 525, 403, 260, 526

[56] References Cited

FOREIGN PATENT DOCUMENTS 9845 2/1895 Switzerland ...................... 285/31

Primary Examiner—Frank Sever
Attorney, Agent, or Firm—Hugh Adam Kirk

[57] ABSTRACT

The disclosure concerns an apparatus for separating various sizes, shapes, and textures of solid particles from a liquid, comprising: a settling tank having an elongated ramp at one end with a scraper flight conveyor, driven at the upper end of the ramp, to scrape settlings from the bottom of the tank up the ramp out of the tank; and at least one cylindrical rotatable filter drum assembly snapped between spaced rigid guide and supporting brackets in the tank. An axial end of the filter drum has a ball duct seating in a socket duct connected to the intake of a continuously-operating pump for circulating filtered liquid to the machine tools with a bypass into a clean tank that overflows into the settling tank. The other end of the filter drum assembly is axially outwardly resiliently pressed, such as by a spring against an opposite wall of the tank, to urge the ball and socket joint together. Flexible handle brackets are provided at opposite ends of the filter drum assembly for easy and quick manual removal of the filter drum for cleaning and/or replacement. Timer and/or sensor controlled reciprocation motors are used for operating the conveyor, and for intermittantly rotating or indexing the cylindrical filter drum against a doctor blade to remove the cake built up upon its perforated cylindrical surface. A large bypass valve is opened between the clean tank and the suction duct to the pump when the filter drum is indexed to relieve the suction filter.

22 Claims, 7 Drawing Figures

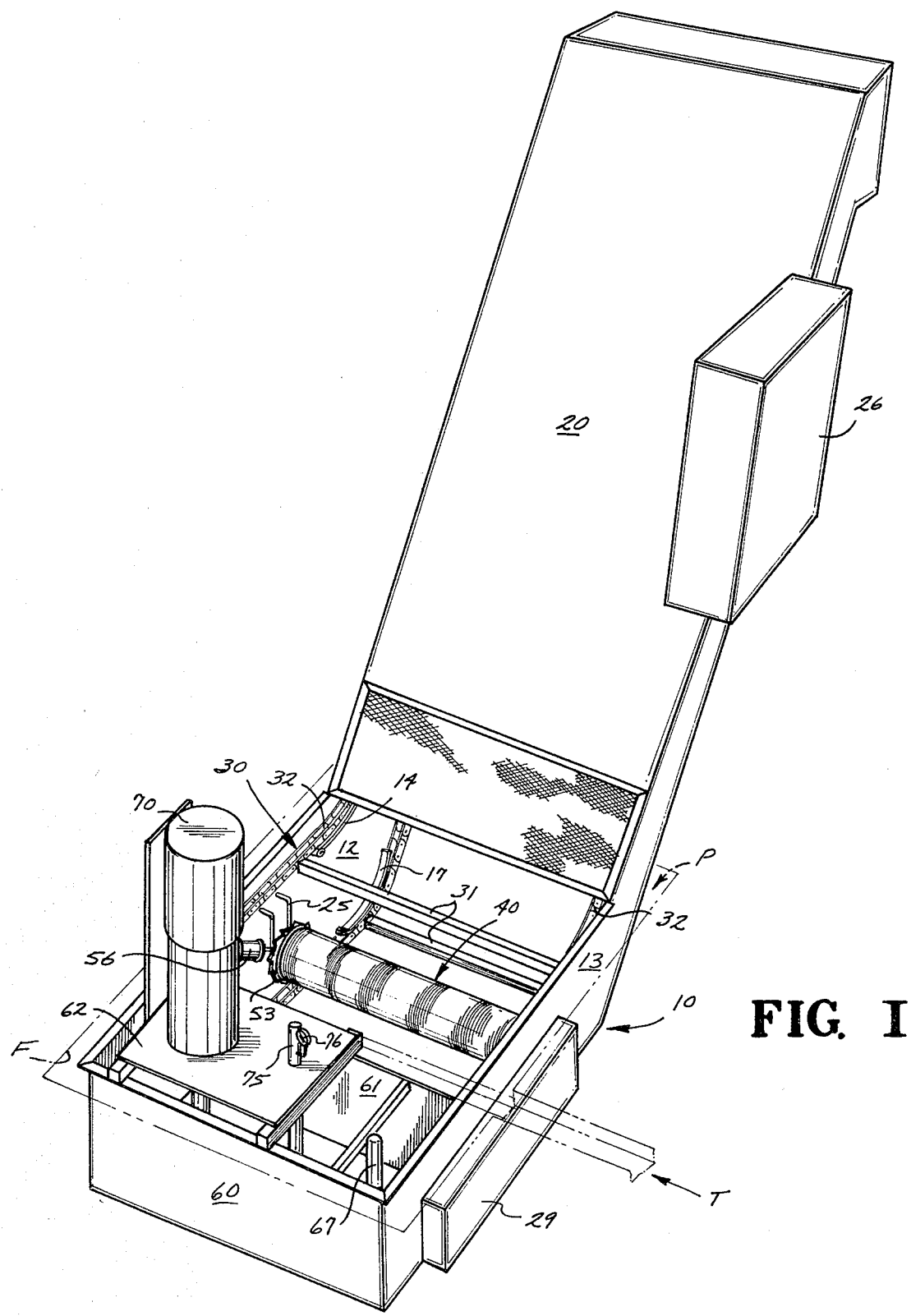
FIG. I

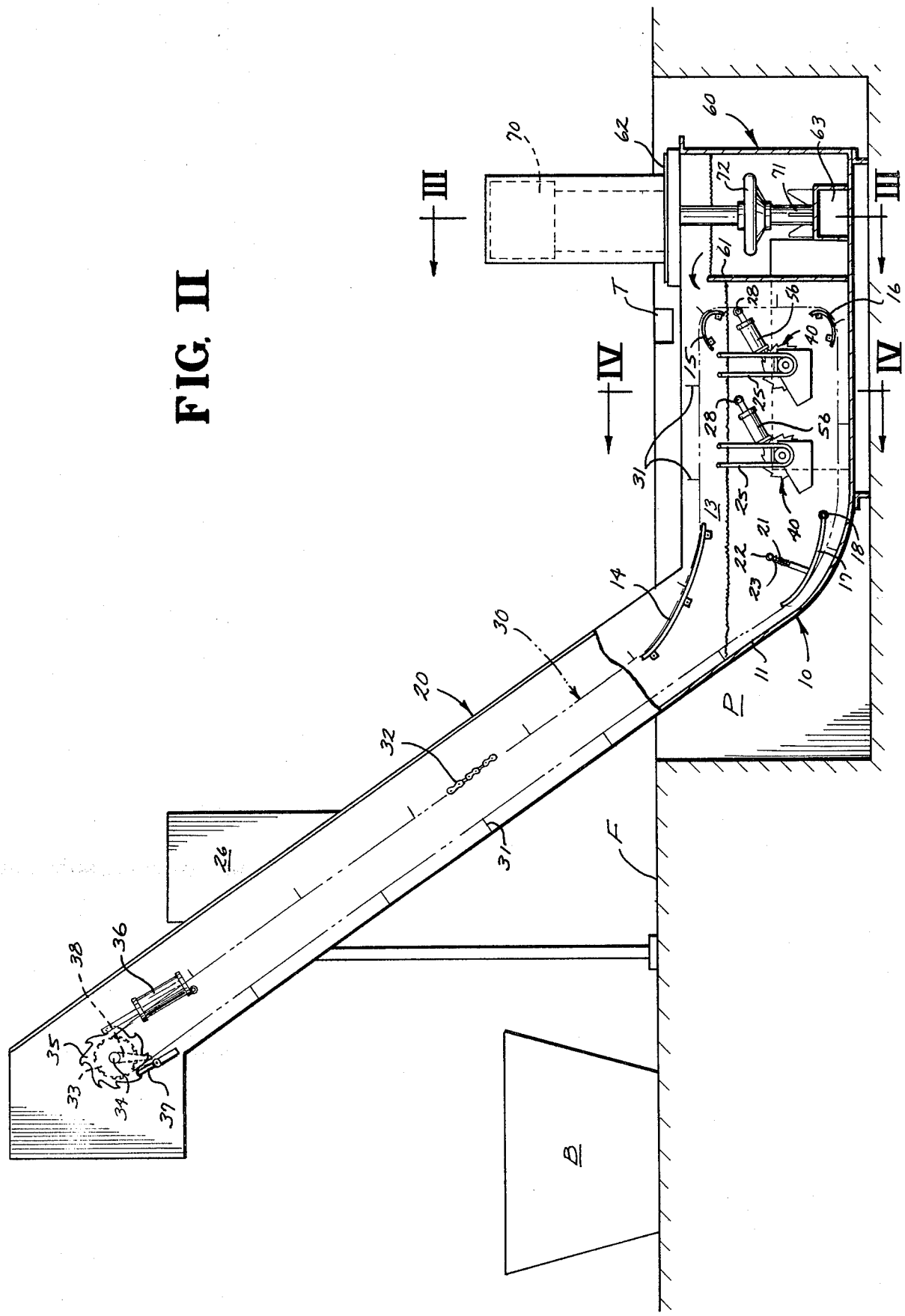
FIG. II

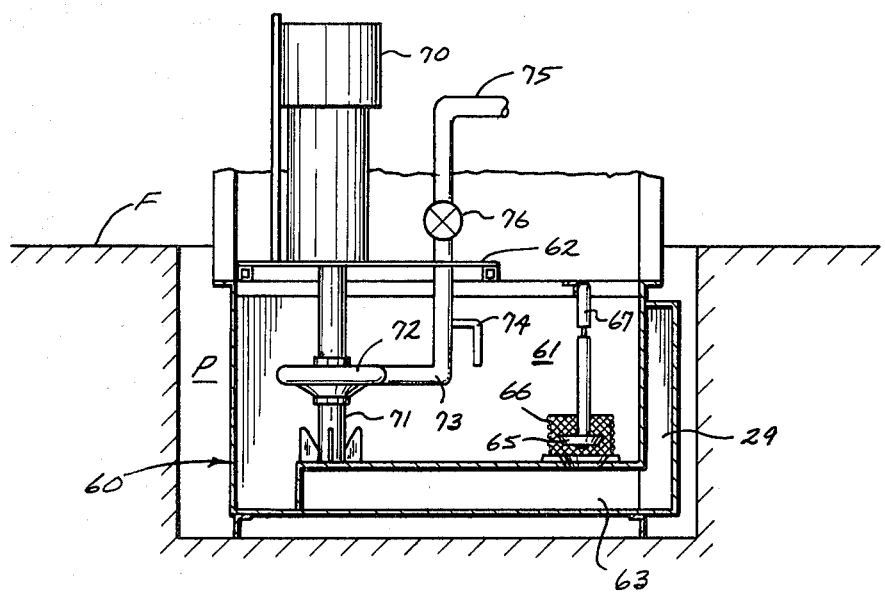
FIG III
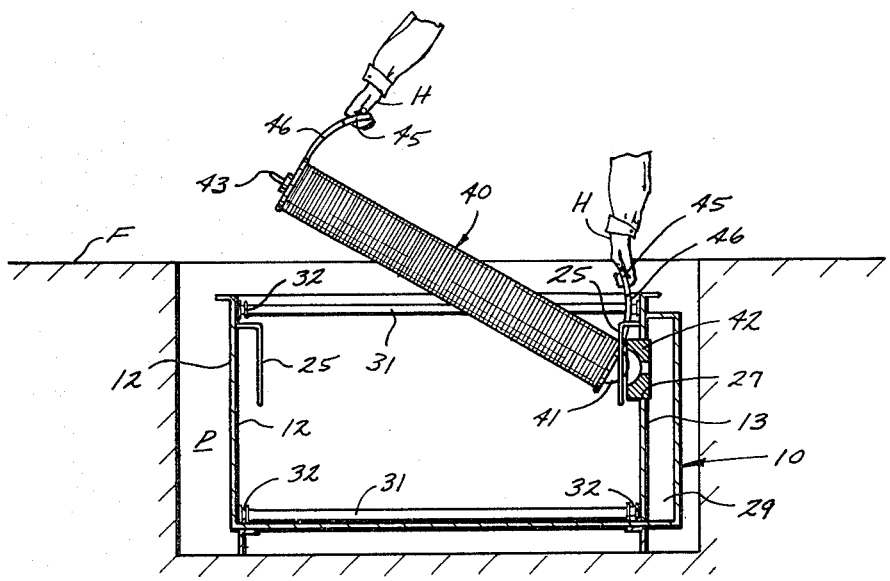
FIG. IV

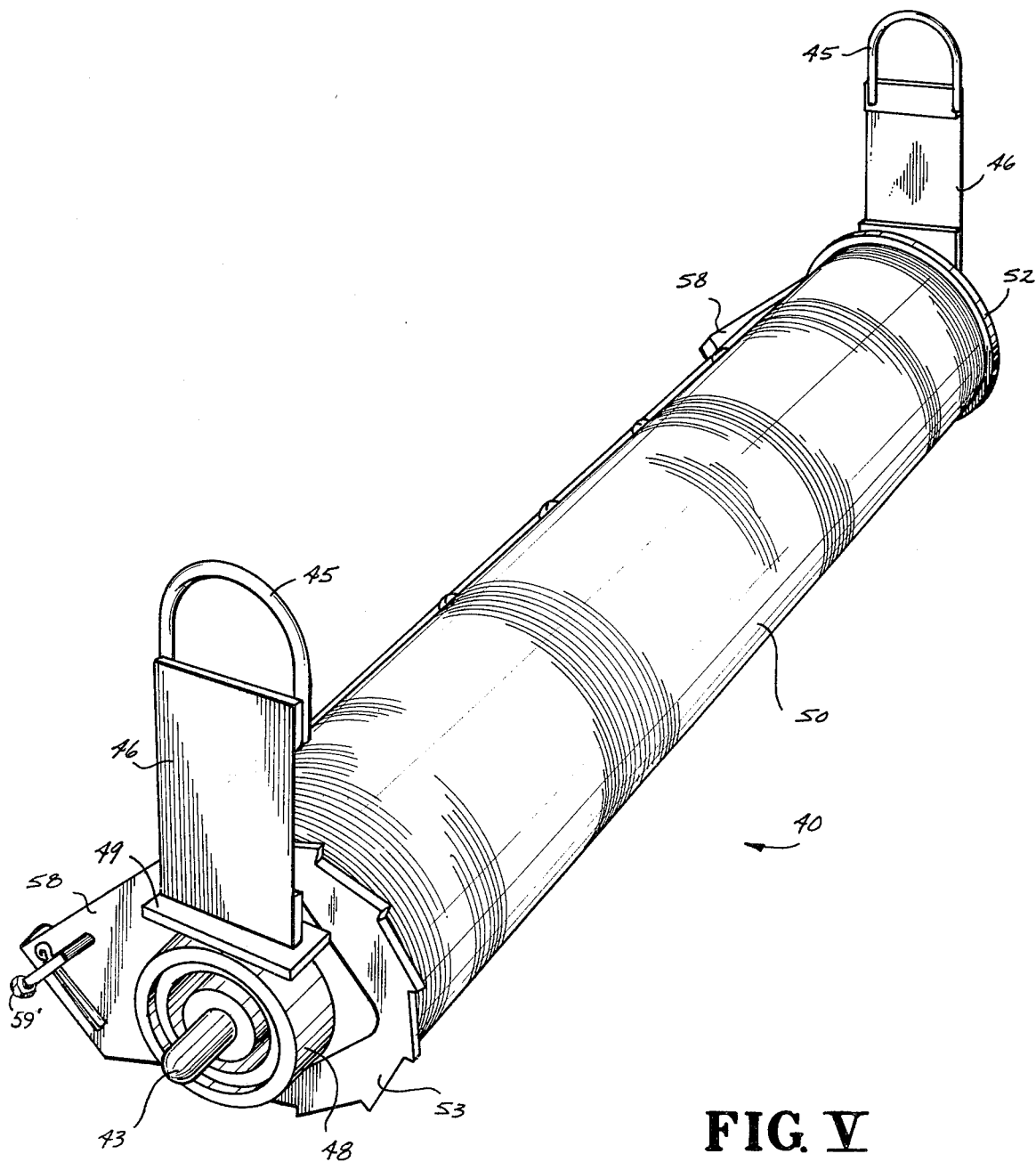
FIG. V

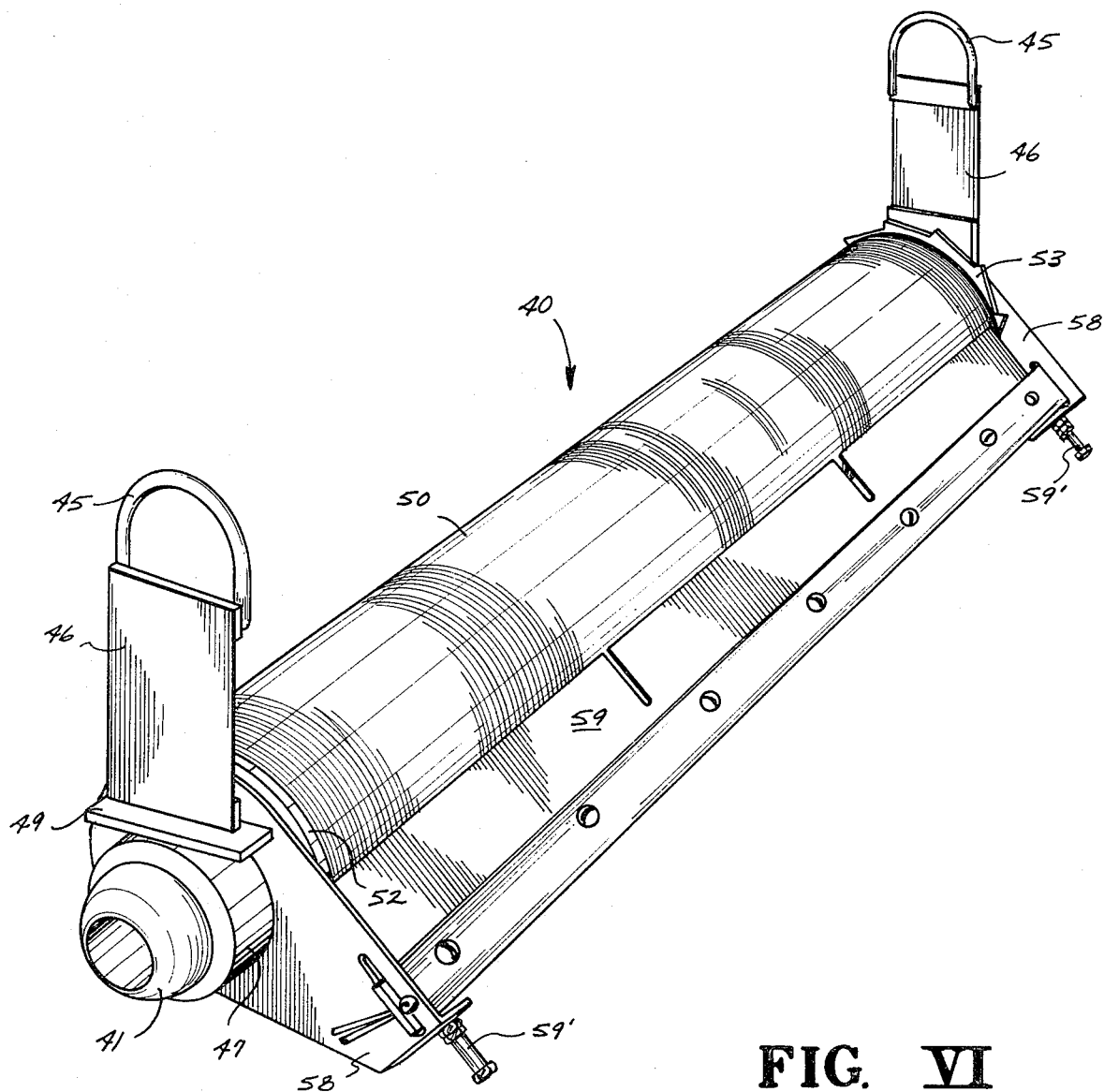
FIG. VI

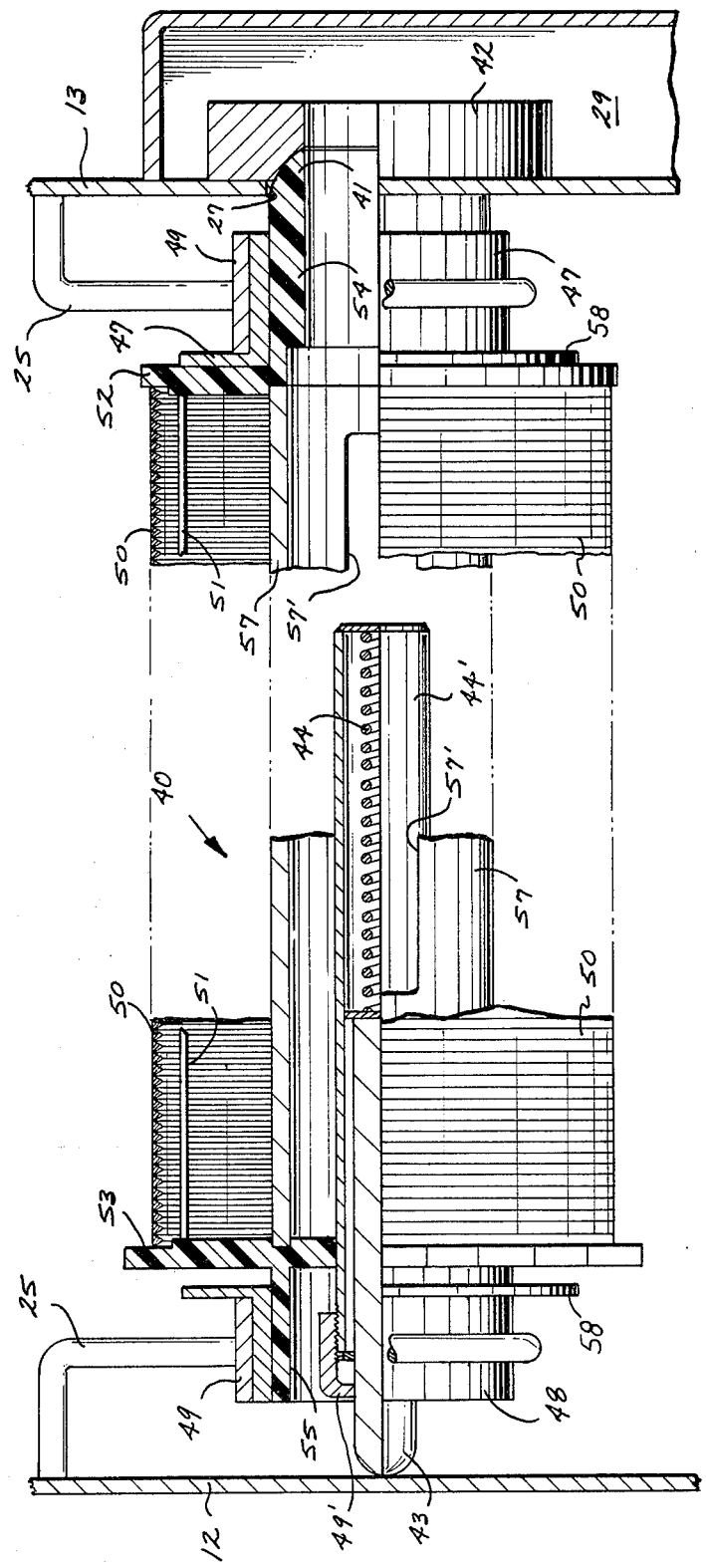
FIG. VII

COMPACT UNIVERSAL DRUM FILTER SETTLER

BACKGROUND OF THE INVENTION

This is an improvement in applicants' assignee's McEwen U.S. Pat. Nos. 3,935,105 for "Tubular Filter and Settler" and Creps et al 4,055,497 for "Hold-Down Mechanism for Scraper Conveyor and Settling Tank".

Previously, settlers with filters for separating solid particles from cutting oils and coolants comprised large tanks with scraper conveyors along their bottoms and up their sloping ends combined with a relatively large plurality of filters, usually located in a separate tank or baffled-off part of the settling tank, which filters required either draining of the tank and/or a special hoist or crane for their replacement and/or maintenance. Such large installations usually purified the cutting oils or coolants for a large plurality of machines in large plants and were designed for removal of specific types of particles and were not universally practical. However, for small plants or one or two machines, an automatic combination cleaning settler with a horizontal indexing drum filter that is easily manually removed, cleaned, and/or replaced employing applicant's invented specific combination of features has not been known.

SUMMARY OF THE INVENTION

Generally speaking, the apparatus of this invention comprises a compact horizontal rotatable cylindrical drum filter in a settler having a dragout conveyor, and a circulating pump having its suction duct connected to one end of the drum filter and a bypass to a clean tank that overflows into the settler. Because of the relatively small size of this separator and its compactness, structural features can be employed which are not practical in prior art larger units.

The settler or dirty liquid tank preferably has a pair of spaced parallel walls or sides and a ramp at one end which usually extends proportionally longer above the tank than in larger units so as to discharge the sediments scraped from the bottom of the tank by the scraper conveyor therein into a normally-sized tote box or container, particularly if the settling tank of the unit is below the floor level so that the input of dirty liquid can flow by gravity into it. However, since the unit is smaller, it is not necessary that idler sprocket wheels be placed in the tank for the sprocket chains between which chains the scraper flights are connected for the conveyor, but these chains may be supported by arcuate guide means at their corners; and, at the base of the ramp, the guide means may be spring-pressed to prevent jamming of the conveyor in the event a large object gets caught in its ascending flight. The inlet for the dirty liquid is preferably at the opposite end of the tank from the ramp end, and may be directed by baffles so that any flotsam will be urged toward the conveyor on the ramp. At the top end of the ramp there may be provided a depending scraper flight cleaner to insure removal of all of the sediments that may stick to the flights. Since it is not necessary that the conveyor be run continuously, it may be driven by a reciprocating motor which ratchets the drive shaft at the upper end of the ramp containing the sprocket wheels for the two parallel chains of the scraper conveyor. Furthermore, the intermittant and slow operation of the conveyor avoids turbulence in the tank and permits better settling of the solid particles.

In the tank, and usually between opposite parallel side walls and parallel with the conveyor flights, there are provided one or more substantially horizontal rotatable perforated cylindrical drum filter assemblies which have depending axially outwardly at one end a ball joint duct and at the other end a resiliently-urged cup or pin. The normal length of the drum filter and its end projections is greater than the distance between the seats therefor, such as in the opposite parallel walls of the tank, so that the ball duct joint fits into a socket duct in an aperture in one wall, and the resilient pin pushes axially against the opposite wall to urge the ball duct into its socket to hold the ball and socket joint duct tightly together. The perforated cylindrical drum may be provided with a ratchet wheel against which a reciprocating motor intermittently steps the drum around its axis. A stationary scraper or doctor blade also may be provided for removing a small portion of the cake built up on the perforations or cylindrical screen by the fine solid particles in the dirty liquid, which cake helps improve the filtration and purification of the liquid treated in the settler-filter of this invention. If desired, the ends of the filter drum assemblies may be provided with handles on flexible brackets so that the drum may be canted by lifting the spring-pressed end first so that the ball end may be horizontally removed from the socket. The size and length of the filter drum assemblies are such that they can easily be removed quickly, cleaned and replaced by one person grabbing in each hand opposite ends of the drum. There are provided spaced rigid guides and supporting brackets in the tank, such as on the inside of opposite parallel side walls of the tank, so that the filter drum assemblies may be removed and installed without draining even opaque liquids from the tank.

The aperture for the socket end of the filter drum, which may be in the wall of the settling tank, is connected to a duct which is connected to the suction or input of a continuously operating circulating pump so that only clean liquid passes through the pump. The outlet of the pump contains a bypass to a clean tank that continuously overflows into the settler so as to provide a reservoir of clean liquid at all times for supply of the coolant or cutting liquid to the machine tools, even during indexing of the drum filters. During indexing a large bypass valve is automatically opened from the clean tank into the suction duct, breaking the suction on the drum filter so the cake can be scraped off easily and settle to the bottom of the tank and be removed by the conveyor flight.

Unexpectedly, the apparatus of this invention is able to separate a wide variety of particles including those of cast iron, steel, aluminum, magnesium, brass, and even grinding wheel abrasives from either oil or waterbase cutting oils and coolant liquids, which separation is enhanced by the quick and easy removal and replacement of the filter drum for quick and easy cleaning without draining the tank.

OBJECTS AND ADVANTAGES

Accordingly, it is an object of this invention to produce a simple, efficient, economic, compact, effective, continuous, universal, and automatic combination settler filter, such as for coolants and/or cutting oils for a large variety of particles.

Another object is to provide such a combination filter and settler in which the filters can be easily and quickly removed for cleaning and maintenance, and replaced without draining the tank and without any outside equipment, hoist, or the like.

Another object is to produce such a combination filter settler which has: no consumable media or continuous expense for its operation, a high degree of filtration, a long filter cycle, and a pump that only handles filtered liquids and thus has little or no abrasive wear.

Another object is to produce such a combination filter settler which can be effective for only one or two machines, and which reduces pollution problems by avoiding dumping of its liquid when a filter is to be removed, cleaned or replaced.

Still another object is to provide such an automatic combination settler and filter in which the conveyor for removal of settlings has means to prevent jamming of the conveyor by large foreign solid objects that may fall into the settling tank.

BRIEF DESCRIPTION OF THE DRAWINGS

The above mentioned and other features, objects and advantages and a manner of attaining them are described more specifically below by reference to embodiments of this invention shown in the accompanying drawings wherein:

FIG. I is a perspective view of a preferred embodiment of a combination compact automatic settler filter comprising one easily removable drum filter;

FIG. II is a side elevation of a unit similar to that shown in FIG. I with the facing side wall of the settler removed showing two removable drums instead of one in the settling tank.

FIG. III is a transverse vertical section taken in the direction of the arrows along line III—III of FIG. II showing the suction duct bypass valve and pump in the clean tank;

FIG. IV is a transverse vertical section taken in the direction of the arrows along line IV—IV of FIG. II showing the manual removal of a drum filter;

FIG. V is an enlarged perspective view of one side of one of the drum filters showing in the foreground the ratchet for indexing the rotation thereof;

FIG. VI is a perspective view of the other end of the drum filter shown in FIG. V showing the doctor or scraper blade; and FIG. VII is an enlarged partially sectional view of one embodiment of the drum filter shown in FIGS. V or VI with parts broken away.

DETAILED DESCRIPTION OF PREFERRED EMBODIMENTS

Referring first to FIGS. I and II, there is shown a settling tank 10 set in a pit P below the floor level F and having at its one sloping end 11 an elongated covered projecting ramp 20 for a drag-out conveyor 30 and a dirty liquid inlet trough or duct T which may have a distributor extension to direct flotsam toward the ramp 20 end of the tank 10.

Between the two parallel sides 12 and 13 of the settling tank 10 there is shown in FIG. I one, and FIG. II two, rotatable cylindrical drum filter assemblies 40. At the opposite end of the tank 10 there is provided a clean tank 60 which is separated from the settling tank by an overflow partition 61. Above the clean tank on a platform 62 there is shown mounted the motor 70 for driving a circulating pump 72 in the clean tank 60.

I. The Settler and its Drag-Out Conveyor

Since the settler and its tank 10 and ramp 20 are relatively small, it is not necessary that idler sprocket wheels be provided in the tank 10 for guiding the parallel sprocket chains 32 of the conveyor 30. Instead, against the insides of the opposite parallel walls 12 and 13 of the settling tank 10 there are provided stationary arcuate guide and supporting strips 14, 15, 16 and a movable guide strip 17, for supporting and guiding the sprocket chains around the four corners of the side walls of the tank. The movable guide 17 is pivoted at its one end 18 and resiliently urged downwardly against the top of the sprocket chain 32 so that if a large object gets dropped into the settler and caught in a conveyor flight 31 it will permit raising of the flight and prevent jamming or breaking the conveyor. This resilient means may comprise a compression spring 21 guided by a sleeve or rod 23 attached at 22 to its adjacent tank side wall. There are also provided on opposite sides of the tank 10 a pair of brackets 25 (see also FIGS. IV and VII) for guiding insertion of and for supporting the ends of the drum filter assemblies 40, which brackets 25 in this embodiment are U-shaped with top side bent ends welded to the side walls 12 and 13 near their upper edges.

The conveyor 30 has spaced driving sprocket wheels 33 keyed to a horizontal shaft 34 journalled in the sides of the upper ends of the ramp extension 20, which shaft 34 also has keyed thereto a ratchet wheel 35 stepped by means of a reciprocating motor 36 mounted on the side of the housing extension 20. This ratchet wheel 35 may be prevented from reversing its direction by a weighted pivoted pawl 37. Between the parallel chains 32 there are provided at regular intervals scraper flights 31, the ends of which may be removably attached to the links of the parallel sprocket chains 32. These scraper flights 31 may be made out of polyurethane or other durable and wearable material. At the top of the ramp extension 20 and depending from the shaft 34 there may be a flight scraper or cleaner 38 to remove any particles that may stick to the flights, so such particles also will drop into the tote box B.

II. The Stepping Drum Filter Assembly

Referring now to FIGS. IV through VII, one of the possibly two or more identical cylindrical perforated rotatable drum filter assemblies 40 is shown to have axial extensions at each end, one end comprising a ball-duct joint 41, the socket 42 of which is placed in an aperture 27 in the side wall 13 of the settling chamber 10; and the other end of which assembly 40 is provided with a spring axially outwardly pressed cap or pin 43 which in the position shown in FIGS. IV, V and VI has an over-all length greater than the distance between the wall 12 and the base of the socket 42 as shown in FIG. IV. Thus, when the filter assembly 40 has its ball duct end 41 placed into the socket 42 guided by the U-shaped bracket 25, the other end may have its pin 43 pressed against the wall 12 of the settling chamber 10 so that its resilient means, which may be a compression spring 44 inside an axially aligned sleeve 44' in the drum assembly 40, will urge the whole assembly 40 and its ball duct 41 into sealing engagement with the socket 42 anchored in the opposite parallel wall 13 of the settling chamber 10. Since it is not possible to lift the ball duct 41 vertically out of its socket 42 in order to remove the drum filter assembly 40, the opposite end with pin 43 must be lifted first as shown in FIG. IV so that ample space above the tank 10 is had to remove the ball duct 41 from socket duct 42. Similarly, in installing the drum filter assembly 40, the same procedure must be followed. If desired, the ends of the filter drum assembly 40 may be provided with lifting handles 45 as shown in FIGS. IV, V and VI, in which event it is necessary that the connections 46 between each handle 45 and the non-rotatable bearing ends 47 and 48 should be inwardly directed or flexible plates to permit clearance from the side walls 12 and 13 as shown particularly at the right end of the assembly 40 in FIG. IV. Although FIG. IV shows two human hands H holding the drum filter assembly 40, this can be done easily by one person straddling the tank 10 and stooping over to perform this lifting operation, without draining the tank or standing in the tank.

Each filter drum assembly 40 may comprise a cylindrical wedge-wire screen 50 reinforced by longitudinal ribs 51 welded inside the cylindrical screen and having their ends mounted to end discs 52 and 53 (see FIG. VII). Disc 52 is centrally apertured and may be integral through a hollow hub portion 54 with the ball duct 41. The disc 53 also has a hollow hub portion 55 and may be peripherally serrated to form a ratchet wheel engageable by a reciprocating stepping motor 56. This stepping motor 56 is pivoted at 28 (see FIGS. I and II) to the side wall 12 of the settler tank 10 so that the motor 56 can easily be swung away from the ratchet wheel when the filter drum assembly 40 is to be replaced. The hub portions 54 and 55 of these end discs 52 and 53 may be separately journalled in the fixed bearing means 47 and 48, respectively, which bearing means 47 and 48 may be anchored from turning in the U-brackets 25 by a square outer configuration or by integral top plates 49. The discs 52 and 53 may be anchored together by a plurality of parallel rods inside the drum screen 50, or by a rotatable cylinder 57 with longitudinal apertures 57', which cylinder 57 is closed at one end by the disc 53. In either construction, clean liquid which passes through the screen 50 can flow unobstructedly out through the apertured disc 52 and hub 54, ball duct 41 and socket duct 42 into a suction duct 29 which may comprise a separate chamber on the outside of the wall 13 of the settling tank 10. The end disc 53 may mount or support a sleeve 44' for the resilient means or spring 44, which spring 44 outwardly axially urges the pin 43. This sleeve 44' is closed at its inner end and threaded at its outer end for a removable screw cap 49' for holding the spring 44 and the outwardly flanged inner end of the pin 43 in the sleeve 44' (see FIG. VII). On the other hand, the resilient urging means may be a compression spring mounted in the hollow hub portion 55 with a cap telescoping into said hub portion.

The stationary bearing means 47 and 48 are provided with radially outwardly extending flanged wing portions 58 for adjustably supporting a scraping or doctor blade 59 (see FIG. VI), radially adjustable by bolts 59' against the outer cylindrical surface of the screen 50. This blade 59 removes a small strip of the fine solid particles that accumulate and form a filter cake on the wedge-wire screen 50 when the cylinder 50 is indexed at intervals by the stepping motor 55. During this stepping, the suction in duct 29 is reduced to aid in allowing the removed particles to settle and be carried out by the flights 31 of the conveyor. The cleaned strip or space along the drum screen 50 then quickly accumulates a thin cake when the stepping is complete and the suction is resumed during the automatic operation of the apparatus of this invention.

III. The Circulating Pump and Clean Tank

Referring now back to FIGS. II and III, the suction duct or chamber 29 is connected to a duct or chamber 63 in the bottom of the clean tank 60, to which duct 63 is connected the suction inlet 71 of the pump 72. The outlet 73 of the pump 72 is provided with a bypass duct 74 for continually keeping the clean tank 60 full of clean liquid so that it always overflows the to of the partition 61 into the dirty tank 10. The normal flow or circulation of the clean liquid to the machine tools is through the output pipe 75 which may contain a regulating valve 76. Between the clean tank 60 and the suction duct 63 there is provided a large bypass poppet or globe valve 65 which may be surrounded by a screen 66, and which valve 65 is operated by a reciprocating motor or solenoid 67 at the same time that indexing is initiated for the drum filter 40 through operation of the reciprocating motor 56. Thus, as soon as the poppet valve 65 opens, the head or higher liquid level in the clean tank 60 than in the settling tank 10 presents a greater pressure to the suction pump inlet 71 than can be produced by the lower liquid level in the settler 10, so that suction on the drum filters 50 during their indexing period is substantially reduced. In the meantime, the pump 72 operates to continue to supply clean liquid from the clean tank 60 through the open valve 66 to the machine tools via pipe 75.

Usually the indexing lasts only about fifteen seconds and may be controlled from a control box 26 by means of timers and/or from sensing devices of the levels of liquid in the tank and/or pressures in the ducts 29, 63, 73 and/or 75 to and/or from the pump 72. This box 26 also controls the operations of the reciprocating or stepping motors 36, 56 and 67 so as to make this combination settler filter as continuous and automatic as possible.

Although the drum filter assembly 40 is shown to be wedged between two parallel walls 12 and 13 of a tank 10, separate spaced brackets may be mounted in any shaped tank for pressing the ends of the assembly 40 and mounting its guiding and supporting brackets 25, as long as quick, easy removal and replacement of the assembly 40 is obtained.

Attention is called to the fact that the pump 72 is only connected to filtered liquid and thereby is not affected or worn by abrasive fines or materials in the dirty liquid. Furthermore, it is to be understood that the intake 71 of the pump 72 may be connected anywhere in the suction ducts 29 and/or 63, even adjacent the aperture 27 in the side wall 13 of the tank 10 without departing from the scope of this invention. Furthermore, the clean tank 60 may be a separate tank and not part of the main settling tank structure separated therefrom by partition 61 as shown therein.

Although many of the parts of this apparatus disclosed are made of metal and preferably stainless steel to avoid or at least reduce corrosion and maintenance, it is also to be understood that many parts can be made out of plastic, including the hubs and/or bearings at the ends of the filter drum assembly 40 shown in FIGS. V, VI and VII, without departing from the scope of this invention.

While there is described above the principles of this invention in connection with specific apparatus, it is to be clearly understood that this description is made only by way of example and not as a limitation to the scope of this invention.

We claim:

1. A combination settler filter for liquids comprising:
   (A) a receiving tank,
   (B) a removable cylindrical drum filter in said tank,
   (C) guide means for guiding and supporting opposite ends of said drum filter in said tank,
   (D) means for enabling removal of said drum filter by hand including:
      (a) a ball and socket-type duct joint between one end of said drum filter and an outlet duct aperture in said tank, and
      (b) resilient means acting on the other end of said drum filter to urge said joint together, and
   (E) means for applying a reduced pressure to said aperture for removing clean liquid therefrom.

2. A settler filter according to claim 1 including flexibly supported handle means at opposite ends of said drum filter for first raising said spring-urged end of said drum filter out of its guide means so that the joint end may be separated, for easy replacing said drum filter.

3. A settler according to claim 1 including means for rotating said drum filter.

4. A settler filter according to claim 3 wherein said rotating means is a reciprocating step motor.

5. A settler according to claim 3 including means for scraping the cylindrical surface of said drum filter as it is rotated.

6. A settler filter according to claim 3 wherein said means for applying a reduced pressure to said aperture includes a bypass valve for reducing the reduced pressure when said drum filter is rotated.

7. A settler filter according to claim 1 including means for removing settlings from said settling tank.

8. A settler filter according to claim 7 wherein said means for removing settlings comprises a bottom scraper conveyor.

9. A settler filter according to claim 1 including a clean tank and wherein said means for applying a reduced pressure comprises a pump connected in a duct between said aperture and said clean tank.

10. A settler filter according to claim 1 wherein said guide means comprise parallel and aligned U-shaped yokes.

11. A filter apparatus comprising a tank having spaced side walls and containing a body of liquid contaminated by solid contaminants, a cylindrical filter drum immersed in the body of liquid and having a foraminous periphery through which the liquid flows with the contaminants being deposited on the drum periphery, an axial extension at each end of said drum, the total length of said drum plus said extensions being greater than the distance between said spaced side walls, means for rotating said drum about the axis defined by said extensions, and means for enabling installing and removal of said filter drum by hand including: resilient means accommodating shortening of said total length and urging said extensions against said spaced side walls, and means including one of said extensions for venting the interior of said filter drum to the inlet of a pump.

12. In a filter apparatus in which a body of liquid containing solid contaminants is retained in a tank having spaced side walls, the improvements of a filter drum having a perforate periphery immersed in said body of liquid, the longitudinal axis of said drum being normal to said side walls, an extension at each axial extremity of said drum, means for enabling removal of said filter drum by hand including: means resiliently urging said extensions into contact with said side walls, respectively, to define the drum longitudinal axis, one of said extensions having a passage therein communicating with the intake side of a clean liquid pump, and means carried by at least one of said axial extensions by which that drum extension can be elevated from said body of liquid.

13. In a filter apparatus in which a body of liquid containing solid contaminants is retained in a tank having spaced side walls, the improvements of a generally cylindrical filter drum assembly immersed in said body of liquid to extend from one side wall to the other and having a perforate periphery accommodating the flow of liquid but not of solid contaminants from said body of liquid into the interior of said drum assembly, means for enabling removal of said assembly by hand including extension means at each end of said drum contacting the adjacent tank side wall under the bias of resilient means forming a part of said extension means, a pump and pump inlet connected through one of said extension means into the interior of said drum assembly to induce liquid flow through the drum periphery, and the entire drum assembly being movable vertically against the resistance of the resilient contact between said side walls and said extension means to install or remove the drum assembly from said body of liquid.

14. A filter apparatus as defined in claim 13, wherein said one of said extension means has an end face of arcuate convex configuration to project into a concave recess in the adjacent tank side wall, the extension means and said recess having registering apertures communicating with said pump, and the other extension means is resiliently urged against the other tank side wall.

15. A filter apparatus as defined in claim 14, wherein said other extension means is provided with an upwardly projecting extension by means of which the adjacent end of the drum can be elevated and the drum pivoted about the arcuate end face of said one extension to facilitate the removal of said drum.

16. In a filtration apparatus, an open-topped dirty liquid tank having parallel, essentially vertical side wall portions; a clean liquid discharge port in one of said wall portions; a rotatable drum positioned between said wall portions and having a perforate periphery accommodating the flow of clean liquid therethrough; a shaft assembly axially of said drum and supporting said drum for rotation; means for enabling removal of said filter drum by hand including: means resiliently biasing the respective ends of the shaft assembly and the adjacent side wall portions into contact to retain the drum and shaft assembly in position in said tank; means accommodating the flow of clean liquid from the interior of said drum to said clean liquid discharge port for flow therethrough; and means carried by said shaft assembly to facilitate installation and removal of said drum and shaft assembly through the top of the tank.

17. A combination settler filter for liquids comprising:
   (A) a settling tank having parallel side walls,
   (B) a removable filter assembly snap-fitting between said side walls, said assembly comprising:
      (a) a cylindrical rotatable drum filter,
      (b) bearing means at the ends of said drum filter,
      (c) a scraper for the cylindrical surface of said drum filter, and (d) means for enabling removal of said filter drum by hand including:
  (1) a ball-type duct joint in said bearing means at one end of said drum filter, and
  (2) resilient means urging the other end of said drum filter axially outwardly through said other bearing means,
(C) guide means attached to said parallel walls for supporting said bearing means and fastening said bearing means from rotation,
(D) means movably attached to said tank for rotating said drum filter,
(E) a socket duct joint adjacent said guide means for seating said ball-type duct joint, and
(F) means for applying a reduced pressure to said socket duct joint.

18. A settler filter according to claim 17 wherein said bearing means include handle means for removing said filter assembly.

19. A combination filter settler according to claim 17 wherein said means for rotating said drum filter comprises a reciprocating motor pivotally attached to one of said side walls.

20. A combination filter settler according to claim 17 wherein said settling tank includes a bottom scraper conveyor for removing settlings from said liquid.

21. A combination settler filter according to claim 17 wherein said means for applying a reduced pressure to said socket duct joint comprises a pump and a reservoir for filtered liquids.

22. A combination settler filter according to claim 17 wherein said guide means comprise U-shaped brackets.

* * * * *

UNITED STATES PATENT AND TRADEMARK OFFICE
CERTIFICATE OF CORRECTION

PATENT NO. : 4,421,645

DATED : December 20, 1983

INVENTOR(S) : John L. Creps et al

It is certified that error appears in the above–identified patent and that said Letters Patent are hereby corrected as shown below:

In the Abstract, line 21, change "reciprocation" to
- - reciprocating - - . Column 6, line 11, change "to" to
- - top - - .

Signed and Sealed this

Seventeenth Day of April 1984

[SEAL]

Attest:

GERALD J. MOSSINGHOFF

*Attesting Officer*      *Commissioner of Patents and Trademarks*